United States Patent
Lee et al.

(10) Patent No.: US 10,377,250 B2
(45) Date of Patent: Aug. 13, 2019

(54) SYSTEM AND METHOD OF CONTROLLING CHARGE OF VEHICLE BATTERY

(71) Applicants: Hyundai Motor Company, Seoul (KR); Kia Motors Corporation, Seoul (KR)

(72) Inventors: Woo Young Lee, Gyeonggi-do (KR); Jin Hwan Jung, Gyeonggi-do (KR); Young Jin Kim, Incheon (KR); Dong Sup Ahn, Seoul (KR); Byeong Seob Song, Gyeonggi-do (KR); Gyu Yeong Choe, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/792,272

(22) Filed: Oct. 24, 2017

(65) Prior Publication Data
US 2018/0354374 A1    Dec. 13, 2018

(30) Foreign Application Priority Data

Jun. 13, 2017    (KR) .................... 10-2017-0074244

(51) Int. Cl.
*B60L 11/18*    (2006.01)
*B60L 53/14*    (2019.01)
(Continued)

(52) U.S. Cl.
CPC .......... *B60L 11/1811* (2013.01); *B60L 53/14* (2019.02); *B60L 53/20* (2019.02); *B60L 53/22* (2019.02); *B60L 2210/14* (2013.01); *H02P 27/06* (2013.01)

(58) Field of Classification Search
CPC .............. B60L 11/1811; B60L 2210/14; B60L 11/1816; H02P 27/06
(Continued)

(56) References Cited

U.S. PATENT DOCUMENTS

| | | | |
|---|---|---|---|
| 5,233,282 A | 8/1993 | Iwashita | |
| 6,204,630 B1 * | 3/2001 | James | H02J 7/022 320/104 |

(Continued)

FOREIGN PATENT DOCUMENTS

| | | |
|---|---|---|
| DE | 102014223227 A1 | 5/2015 |
| DE | 102014004790 A1 | 10/2015 |

(Continued)

OTHER PUBLICATIONS

Extended European Search Report for European Patent Application No. EP17201993, dated Apr. 12, 2018, 8 pages.

(Continued)

*Primary Examiner* — Sun J Lin
(74) *Attorney, Agent, or Firm* — Mintz Levin Cohn Ferris Glovsky and Popeo, P.C.; Peter F. Corless (57) ABSTRACT

A system and a method of controlling charge of a vehicle battery are provided. In particular, when a voltage of the vehicle battery is different from an output voltage of a commercially available quick charger, a compatibility problem is solved through a converter, thereby allowing an inverter, an electric motor, and a connector to have an increased efficiency and to maximize a reduction in size, weight, and material cost thereof.

17 Claims, 6 Drawing Sheets

(51) Int. Cl.
*B60L 53/22* (2019.01)
*B60L 53/20* (2019.01)
*H02P 27/06* (2006.01)

(58) Field of Classification Search
USPC ........................................................ 320/109
See application file for complete search history.

(56) References Cited

U.S. PATENT DOCUMENTS

| | | | | |
|---|---|---|---|---|
| 6,894,463 | B2* | 5/2005 | Kernahan | G05F 3/262 323/267 |
| 2007/0139012 | A1 | 6/2007 | Hayashigawa | |
| 2011/0292703 | A1* | 12/2011 | Cuk | H02M 1/4258 363/126 |
| 2014/0035531 | A1* | 2/2014 | Garnier et al. | B60L 11/1853 320/118 |
| 2016/0301119 | A1* | 10/2016 | Izumi et al. | H01M 10/613 |
| 2017/0155266 | A1* | 6/2017 | Namou et al. | H02J 7/0057 |
| 2017/0243530 | A1* | 8/2017 | Kwon et al. | G09G 3/2092 |
| 2017/0305289 | A1 | 10/2017 | Meitinger et al. | |
| 2018/0342897 | A1* | 11/2018 | Huang et al. | H02J 50/12 |

FOREIGN PATENT DOCUMENTS

| | | |
|---|---|---|
| DE | 102014225782 A1 | 2/2016 |
| DE | 102014016620 A1 | 4/2016 |
| DE | 102016008052 A1 | 2/2017 |
| EP | 2562030 A2 | 2/2013 |
| EP | 2624427 A2 | 8/2013 |
| EP | 2965942 A1 | 1/2016 |
| KR | 2009-0039918 A | 4/2009 |
| KR | 2014-0079626 A | 6/2014 |

OTHER PUBLICATIONS

Partial European Search Report for European Patent Application No. 17202028, dated Sep. 6, 2018, 16 pages.

D. Baba, "Under the Hood of a Multiphase Synchronous Rectified Boost Converter", Texas Instruments Power Supply Design Seminar, 2014, 22 pages.

Extended European Search Report for European Patent Application No. 17202028, dated Jan. 25, 2019, 16 pages.

* cited by examiner

SYSTEM AND METHOD OF CONTROLLING CHARGE OF VEHICLE BATTERY

CROSS REFERENCE TO RELATED APPLICATION

The present application claims priority to Korean Patent Application No. 10-2017-0074244, filed Jun. 13, 2017, the entire contents of which is incorporated herein for all purposes by this reference.

BACKGROUND

Field of the Invention

The present invention relates generally to a system and a method of controlling charge of a vehicle battery, and more particularly, to a system and a method of controlling charge of a vehicle battery, in which when a voltage of the vehicle battery is different from an output voltage of a commercially available quick charger. Accordingly, a compatibility problem is capable of being solved through a converter, thereby allowing an inverter, an electric motor, and a connector to have increased efficiency and to maximize a reduction in size, weight, and material cost thereof.

Description of the Related Art

In general, an eco-friendly vehicle such as a hybrid vehicle, an electric vehicle, etc. require a high-voltage battery capable of storing electric energy, an electric motor as a power source, and an inverter for driving the electric motor. In recent years, various efforts have been made to increase efficiency of the inverter and the electric motor as well as to increase battery capacity for increasing miles per gallon-equivalent (MPGe) of the electric vehicle.

Recently, a method of increasing a voltage of a vehicle battery has been developed for improving the efficiency of the inverter and the electric motor. For example, when the battery voltage is doubled, according to the equation P=VI, the current flowing through the inverter and the electric motor is reduced by half and the conduction loss ($I^2R$) is reduced by a quarter, based on equal output power. Therefore, the efficiency of the inverter and the electric motor may be increased as the conduction loss is reduced. When using a power device and a conductor having high conduction resistance, it may be possible to reduce the size and material cost of the inverter, the electric motor, and the connector between the battery, the inverter and the electric motor.

However, many commercially available quick chargers currently in the market are only capable of charging a vehicle battery ranging from 200 to 500 V. Thus, a compatibility problem with such quick chargers limits the method for increasing the voltage of the vehicle battery. Thus, a solution is needed solve the compatibility problem between the high-voltage battery and the quick chargers.

The foregoing is intended merely to aid in the understanding of the background of the present invention, and is not intended to mean that the present invention falls within the purview of the related art that is already known to those skilled in the art.

SUMMARY

Accordingly, the present invention provides a system and a method of controlling charge of a vehicle battery, in which when a voltage of the vehicle battery is different from an output voltage of a commercially available quick charger, a compatibility problem is solved through a converter, thereby allowing an inverter, an electric motor, and a connector to have increased efficiency and to maximize a reduction in size, weight, and material cost thereof.

According to one aspect of the present invention, a system for controlling charge of a vehicle battery may include: a high-voltage battery mounted in a vehicle and configured to supply electric power to a drive unit of the vehicle; a boost converter mounted within the vehicle and electrically connected to the high-voltage battery; an external charging device disposed extraneous to the vehicle and electrically connected to the boost converter, the external charging device configured to charge the high-voltage battery by supplying electric power to the high-voltage battery using the boost converter; and a controller configured to measure a voltage of an external charging device-side input terminal of the boost converter and a voltage of a high-voltage battery-side output terminal of the boost converter, and operate the boost converter when the voltage of the input terminal of the boost converter is less than the voltage of the output terminal of the boost converter.

The boost converter may include a plurality of boosting circuits configured in parallel, and each of the boosting circuits may include an inductor, a switching device, and a diode. The controller may be configured to operate the boost converter by generating a potential difference between the switching devices of the plurality of boosting circuits configured in parallel. The boost converter may include a plurality of boosting circuits configured in parallel, and each of the boosting circuits may include an inductor, a first switching device, and a second switching device.

Further, the controller may be configured to measure the voltage of the external charging device-side input terminal of the boost converter, and thus, when the voltage of the input terminal of the boost converter is less than a voltage of the high-voltage battery, the controller may be configured to turn on the first and second switching devices, and then generate a potential difference between the first switching devices of the plurality of boosting circuits configured in parallel and generate a potential difference between the second switching devices of the plurality of boosting circuits configured in parallel, thereby operating the boost converter. The controller may be configured to measure the voltage of the external charging device-side input terminal of the boost converter, and thus, when the voltage of the input terminal of the boost converter is greater than or equal to a voltage of the high-voltage battery, the controller may be configured to turn off the first switching devices and turn on the second switching devices.

According to another aspect of the present invention, a method of controlling charge of a vehicle battery may include: determining whether charging of the vehicle battery is required; comparing a voltage of the battery and an output voltage of a charging device when charging of the battery is required; and operating a boost converter when the voltage of the battery is higher than the output voltage of the charging device.

According to yet another aspect of the present invention, a system for controlling charge of a vehicle battery may include: a first high-voltage battery configured to supply electric power to a front wheel drive unit of a vehicle; a second high-voltage battery configured to supply electric power to a rear wheel drive unit of the vehicle; a bidirectional converter mounted within the vehicle and electrically connected at a first side thereof to the first high-voltage battery and at a second side thereof to the second high-voltage battery; and external charging devices disposed extraneous to the vehicle, each of the external charging devices being electrically connected to the first high-voltage battery or the second high-voltage battery, and configured to charge the high-voltage batteries by supplying electric power using the bidirectional converter to a remaining one of the first and second high-voltage batteries that is electrically unconnected to the external charging device; and a controller configured to measure a voltage of a first high-voltage battery-side input terminal of the bidirectional converter and a voltage of a second high-voltage battery-side output terminal of the bidirectional converter, and operate the bidirectional converter when the voltage of the input terminal of the bidirectional converter is different from the voltage of the output terminal of the bidirectional converter.

The external charging devices may include a first charging device and a second charging device, and an output voltage of the first charging device may be less than an output voltage of the second charging device. When the first charging device is connected to the first high-voltage battery, and a voltage of the first high-voltage battery is less than a voltage of the second high-voltage battery, the controller may be configured to operate a boost converter. When the second charging device is connected to the second high-voltage battery, and a voltage of the first high-voltage battery is less than a voltage of the second high-voltage battery, the controller may be configured to operate a buck converter.

The bidirectional converter may include an inductor, a third switching device, and a fourth switching device. The bidirectional converter may include a plurality of converting circuits configured in parallel, and each of the converting circuits may include an inductor, a third switching device, and a fourth switching device. The controller may be configured to generate a potential difference between the third switching devices of the plurality of converting circuits configured in parallel, and generate a potential difference between the fourth switching devices of the plurality of converting circuits configured in parallel, thereby operating the bidirectional converter.

According to a further aspect of the present invention, a method of controlling charge of a vehicle battery may include: determining whether a first charging device is connected to a first high-voltage battery or whether a second charging device is connected to a second high-voltage battery; determining whether charging of the first high-voltage battery and charging of the second high-voltage battery are required when the first charging device is connected to the first high-voltage battery or the second charging device is connected to the second high-voltage battery; comparing a voltage of the first high-voltage battery and a voltage of the second high-voltage battery when charging of the first and second high-voltage batteries is required; and operating a bidirectional converter when the voltage of the first high-voltage battery voltage is less than the voltage of the second high-voltage battery voltage. In the operating of the bidirectional converter, when the first charging device is connected to the first high-voltage battery, a boost converter may be operated. Additionally, in the operating of the bidirectional converter, when the second charging device is connected to the second high-voltage battery, a buck converter may be operated.

According to the system and the method of controlling charge of the vehicle battery of the present invention, when a voltage of the vehicle battery is different from an output voltage of a commercially available quick charger, a compatibility problem may be solved using a converter, thereby allowing an inverter, an electric motor, and a connector to have increased efficiency and to maximize a reduction in size, weight, and material cost thereof. Further, even when a voltage of the battery for the front-wheel is different from a voltage of the battery for the rear-wheel, it may be possible to simultaneously charge both batteries with one quick charger. The batteries re also capable of being compatible with both a commercially available quick charger (output voltage of 200 to 500 V) and a high-voltage quick charger (output voltage of equal to or greater than 500 V) by configuring two charge ports, and it may be possible to simultaneously charge the batteries for the front and rear wheels with any one of both quick chargers.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinbelow, a system and a method of controlling charge of a vehicle battery according to exemplary embodiments of the present invention will be described in detail with reference to the accompanying drawings. Throughout the drawings, the same reference numerals will refer to the same or like parts.

Figure 1:
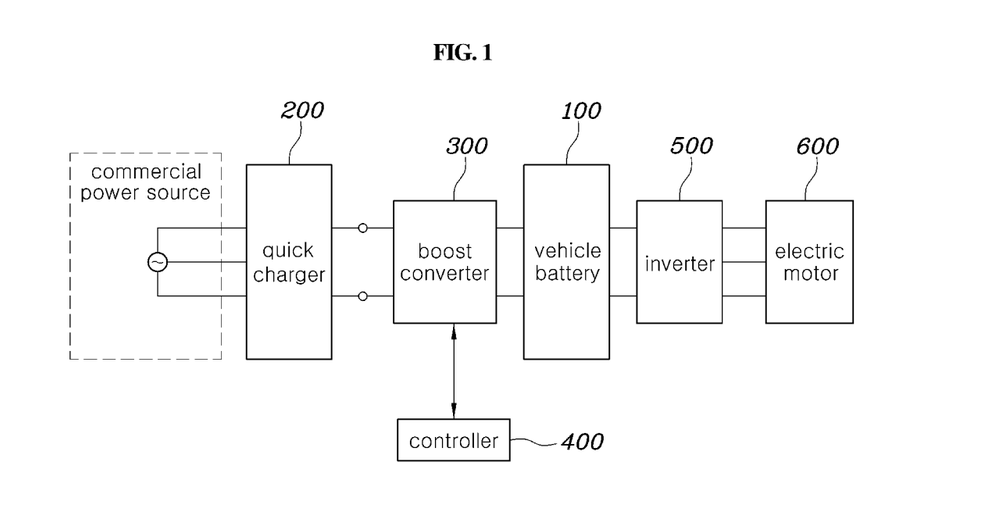
FIG. 1 is a configuration diagram showing a system for controlling charge of a vehicle battery according to an exemplary embodiment of the present invention.
Figure 2:
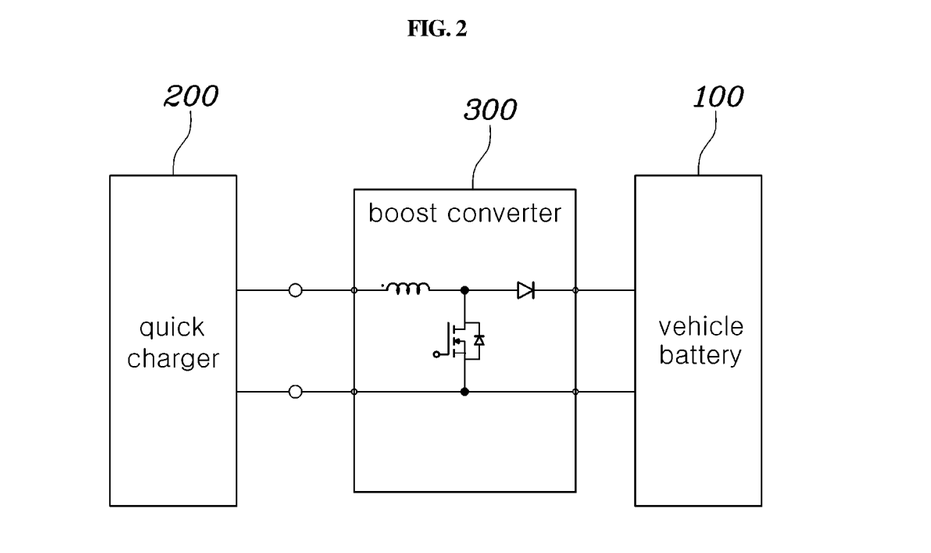
FIG. 2 is a configuration diagram showing a boost converter of the system for controlling charge of the vehicle battery according to the exemplary embodiment of the present invention.
Figure 3:
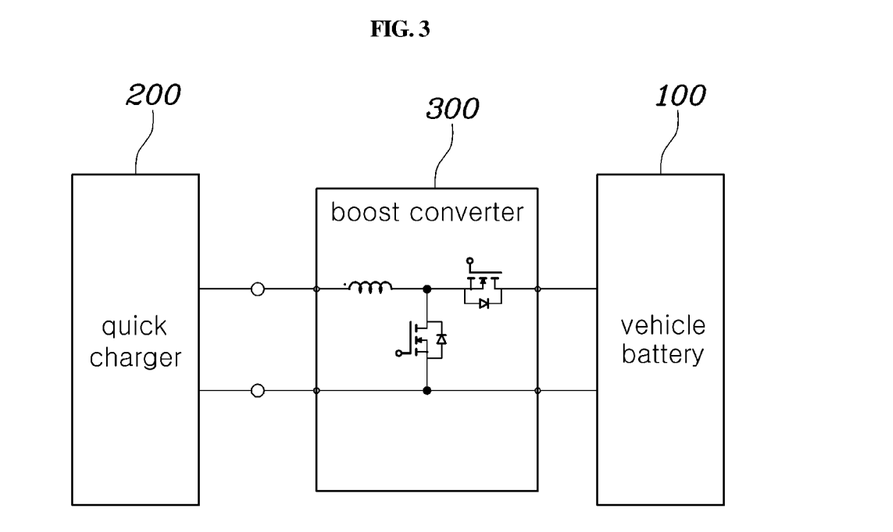
FIG. 3 is a configuration diagram showing the boost converter of the system for controlling charge of the vehicle battery according to the exemplary embodiment of the present invention.
Figure 4:
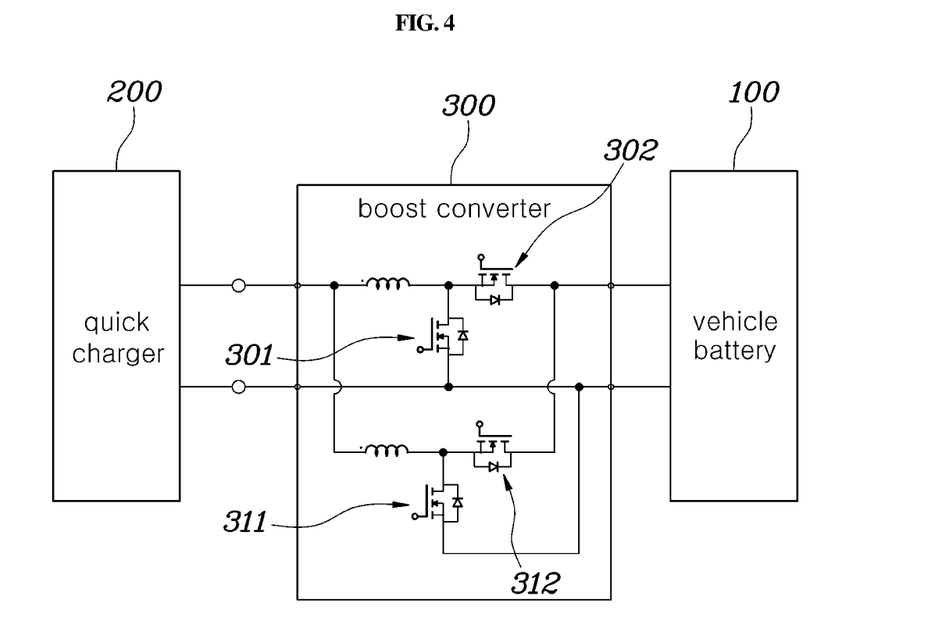
FIG. 4 is a configuration diagram showing the boost converter of the system for controlling charge of the vehicle battery according to the exemplary embodiment of the present invention.
Figure 5:
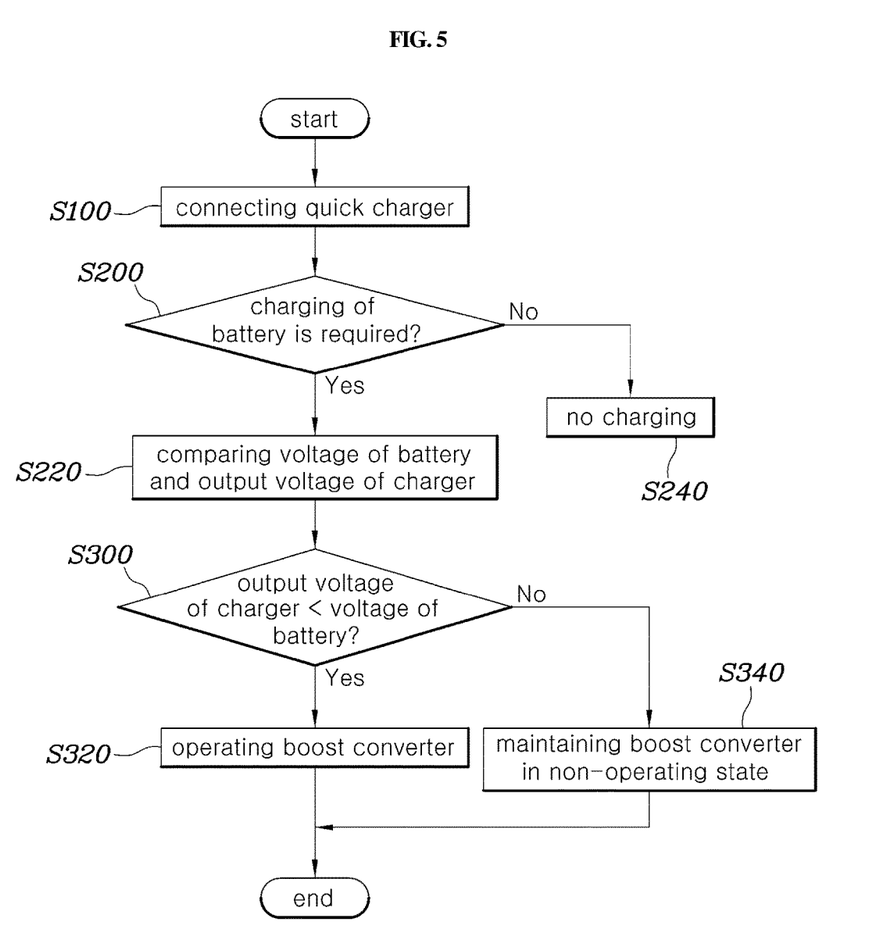
FIG. 5 is a flow chart showing a method of controlling charge of a vehicle battery according to an exemplary embodiment of the present invention.
Figure 6:
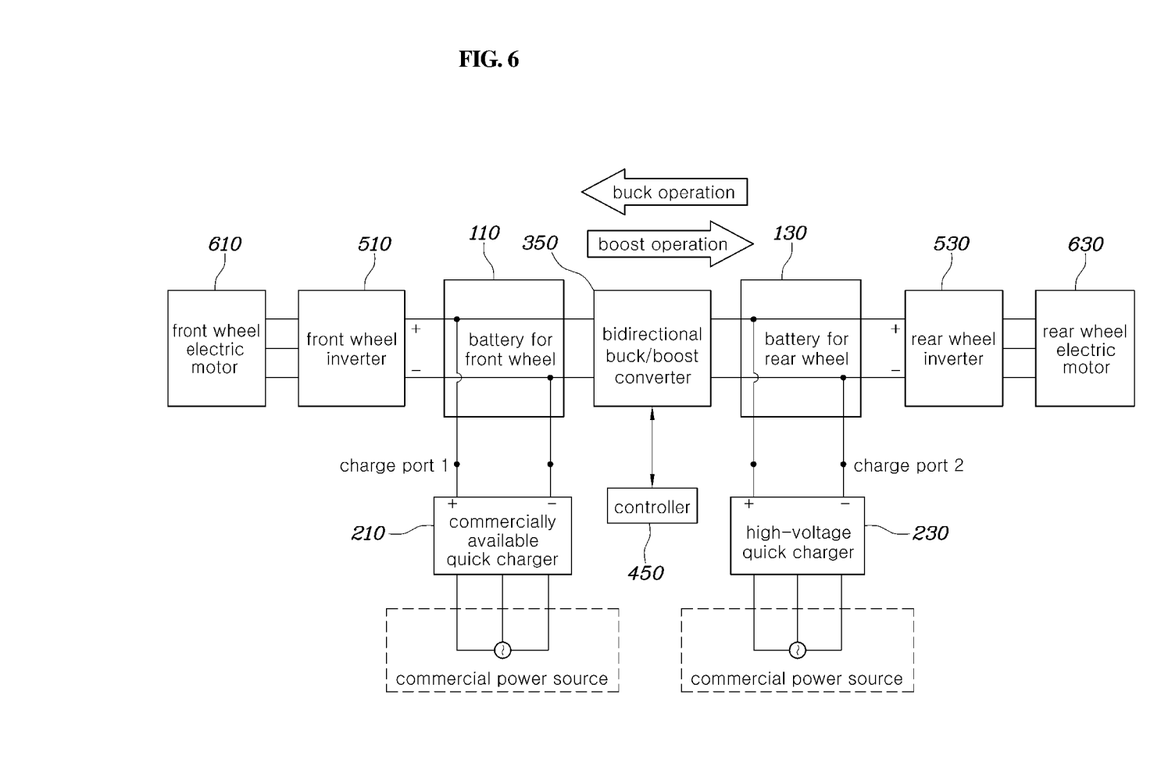
FIG. 6 is a configuration diagram showing a system for controlling charge of a vehicle battery according to an exemplary embodiment of the present invention.
Figure 7:
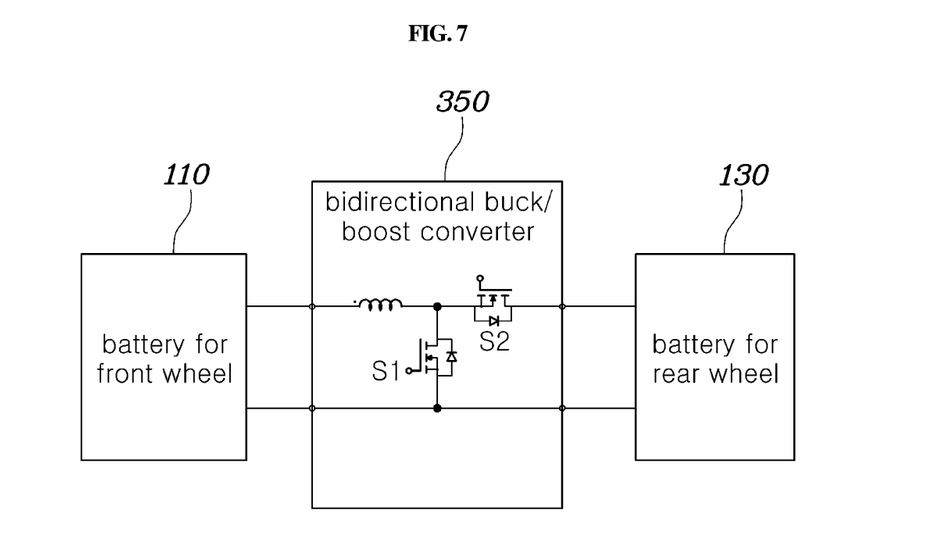
FIG. 7 is a configuration diagram showing a bidirectional converter of the system for controlling charge of the vehicle battery according to the exemplary embodiment of the present invention.
Figure 8:
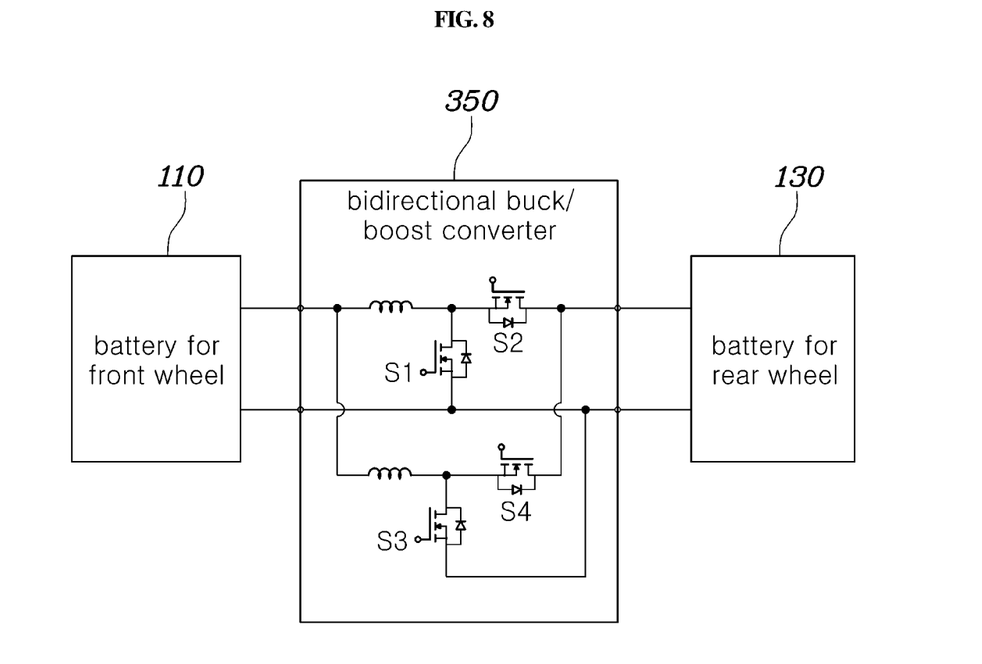
FIG. 8 is a configuration diagram showing the bidirectional converter of the system for controlling charge of the vehicle battery according to the exemplary embodiment of the present invention.
Figure 9:
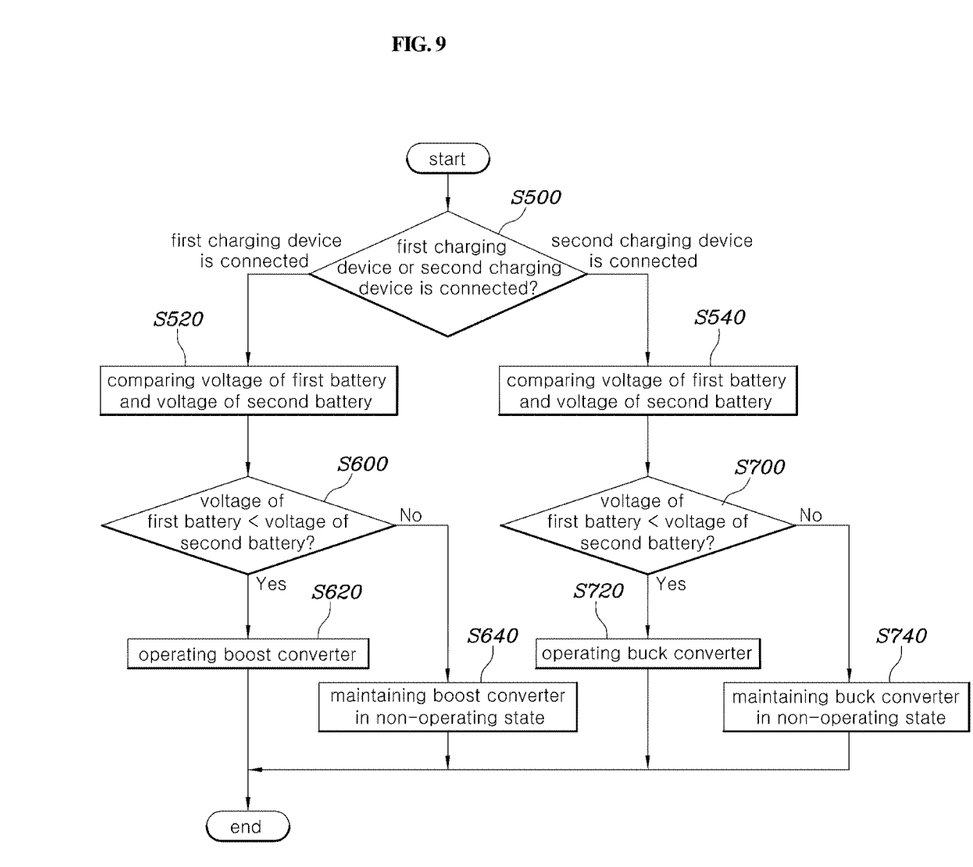
FIG. 9 is a flow chart showing a method of controlling charge of a vehicle battery according to an exemplary embodiment of the present invention.

FIG. 1 is a configuration diagram showing a system for controlling charge of a vehicle battery according to an exemplary embodiment of the present invention, FIGS. 2-4 are configuration diagrams showing a boost converter of the system for controlling charge of the vehicle battery according to the embodiment of the present invention, FIG. 5 is a flow chart showing a method of controlling charge of a vehicle battery according to an embodiment of the present invention, FIG. 6 is a configuration diagram showing a system for controlling charge of a vehicle battery according to an embodiment of the present invention, FIG. 7 is a configuration diagram showing a bidirectional converter of the system for controlling charge of the vehicle battery according to the embodiment of the present invention, FIG. 8 is a configuration diagram showing the bidirectional converter of the system for controlling charge of the vehicle battery according to the embodiment of the present invention, and FIG. 9 is a flow chart showing a method of controlling charge of a vehicle battery according to an exemplary embodiment of the present invention.

Referring to FIG. 1, the system for controlling charge of the vehicle battery according to the exemplary embodiment of the present invention may include: a high-voltage battery 100 mounted in a vehicle and configured to supply electric power to a drive unit (electric motor) 600 of the vehicle; a boost converter 300 mounted within the vehicle and electrically connected to the high-voltage battery 100; an external charging device (quick charger) 200 disposed extraneous to the vehicle and electrically connected to the boost converter 300, the external charging device configured to charge the high-voltage battery 100 by supplying electric power to the high-voltage battery 100 using the boost converter 300; and a controller 400 configured to measure a voltage of an external charging device-side input terminal of the boost converter 300 and a voltage of a high-voltage battery-side output terminal of the boost converter 300, and operate the boost converter 300 when the voltage of the input terminal of the boost converter 300 is less than the voltage of the output terminal of the boost converter 300.

Particularly, in the exemplary embodiment of the present invention, the external charging device 200 may be a commercially available quick charger having a voltage range of about 200 to 500 V. The boost converter 300 may be disposed between the external charging device 200 and the high-voltage battery 100, and the controller 400 may be configured to measure the voltage of the external charging device-side input terminal of the boost converter 300 and the voltage of the high-voltage battery-side output terminal of the boost converter 300. Then, when the voltage of the input terminal of the boost converter 300 is less than the voltage of the output terminal of the boost converter 300, the controller 400 may be configured to operate the boost converter 300, thereby solving the compatibility problem with the commercially available quick charger.

When the voltage of the input terminal of the boost converter 300 is greater than or equal to the output terminal voltage of the boost converter 300, the controller 400 does not operate the boost converter 300. In other words, the controller 400 may be configured to charge the high-voltage battery 100 by maintaining the boost converter 300 in a non-operating state when a voltage of the high-voltage battery 100 is within the voltage range of the external charging device 200.

Referring to FIG. 2, in the exemplary embodiment of the present invention, the boost converter 300 may include a boosting circuit having an inductor, a switching device, and a diode. In particular, the switching device may include all semiconductor devices capable of high-frequency switching (several kHz) such as a MOSFET/IGBT.

Referring to FIG. 3, in the exemplary embodiment of the present invention, the diode of the boosting circuit may be replaced with the switching device. Since the diode of the boosting circuit may be replaced with the switching device, conduction loss of the switching device is minimal compared to the diode and thus, efficiency of the boost converter 300 may be increased. As described above, the switching device may include all semiconductor devices capable of high-frequency switching (several kHz) such as the MOSFLT/IGBT.

Meanwhile, the switching device replacing the diode operates complementarily to a switching device may be connected in parallel with the inductor. Complementary operation means that, for example, the switching device replacing the diode operates at an on-duty ratio of about 20% when the switching device connected in parallel with the inductor operates at an on-duty ratio of about 80%. Conversely, when the switching device connected in parallel with the inductor operates at an on-duty ratio of about 20%, the switching device replacing the diode operates at an on-duty ratio of about 80%.

Referring to FIG. 4, in the exemplary embodiment of the present invention, the boost converter 300 may include boosting circuits configured in parallel. Each of the boosting circuits may include an inductor, a first switching device 301 or 311, a second switching device 302 or 312. By configuring the boosting circuits in parallel, inductor ripple current may be reduced. Further, the controller 400 may be configured to operate the boost converter 300 by generating a potential difference between the switching devices of a plurality of boosting circuits configured in parallel.

More specifically, the controller 400 may be configured to measure the voltage of the external charging device-side input terminal of the boost converter 300. When the voltage of the input terminal of the boost converter 300 is less than the voltage of the high-voltage battery 100, the controller 400 may be configured to turn on the first switching devices 301 and 311 and the second switching devices 302 and 312, and then generate a potential difference between the first switching devices 301 and 311 of the plurality of boosting circuits configured in parallel and generate a potential difference between the second switching devices 302 and 312 of the plurality of boosting circuits configured in parallel, thereby operating the boost converter 300. In particular, a potential difference between the switching devices may be 360 degrees/parallel number. For example, as shown in FIG. 4, the potential difference between the switching devices may be 180 degrees in the case of two parallel numbers, and may be 120 degrees in the case of three parallel numbers.

In the exemplary embodiment of the present invention, as shown in FIG. 4, the controller 400 may be configured to generate the potential difference (180 degrees) between the first switching devices 301 and 311 of the plurality of boosting circuits configured in parallel and generate the potential difference (180 degrees) between the second switching devices 302 and 312 of the plurality of boosting circuits configured in parallel, thereby operating the boost converter 300. Particularly, the first switching devices 301 and 311 and the second switching devices 302 and 312 may operate complementarily to each other.

Moreover, the controller 400 may be configured to measure the voltage of the external charging device-side input terminal of the boost converter 300. When the voltage of the input terminal of the boost converter 300 is greater than or equal to the voltage of the high-voltage battery 100, the controller 400 may be configured to maintain the boost converter 300 in the non-operating state by turning off the first switching devices 301 and 311 and by turning on the second switching devices 302 and 312, to thus charge the high-voltage battery 100.

Referring to FIG. 5, a method of controlling charge of a vehicle battery according to an exemplary embodiment of the present invention may include: determining, by a controller, whether charging of a vehicle battery is required (S200); comparing, by the controller, a voltage of the battery and an output voltage of a charging device when charging of the battery is required (S220); and operating, by the controller, a boost converter when the voltage of the battery is greater than the output voltage of the charging device (S300 and S320).

Referring to FIG. 6, a system for controlling charge of a vehicle battery according to an exemplary embodiment of the present invention may include: a first high-voltage battery 110 configured to supply electric power to a front wheel drive unit (front wheel electric motor) 610 of a vehicle; a second high-voltage battery 130 configured to supply electric power to a rear wheel drive unit (rear wheel electric motor) 630 of the vehicle; a bidirectional converter 350 mounted within the vehicle and electrically connected at a first side thereof to the first high-voltage battery 110 and at a second side thereof to the second high-voltage battery 130; and external charging devices 210 and 230 disposed extraneous to the vehicle, each of the external charging devices being electrically connected to the first high-voltage battery 110 or the second high-voltage battery 130, and configured to charge the high-voltage batteries by supplying electric power using the bidirectional converter 350 to a remaining one of the first and second high-voltage batteries 110 and 130 that is electrically unconnected to the external charging device; and a controller 450 configured to measure a voltage of a first high-voltage battery-side input terminal of the bidirectional converter 350 and a voltage of a second high-voltage battery-side output terminal of the bidirectional converter 350 and operate the bidirectional converter 350 when the voltage of the input terminal of the bidirectional converter 350 is different from the voltage of the output terminal of the bidirectional converter 350.

In particular, the first high-voltage battery 110 may be a battery for a front wheel of the vehicle that provides electric power to the front wheel drive unit (front wheel electric motor) 610 of the vehicle, and the second high-voltage battery 130 may be a battery for a rear wheel of the vehicle that provides electric power to the rear wheel drive unit (rear wheel electric motor) 630 of the vehicle. The bidirectional converter 300 may be a converter configured to perform both buck and boost operations.

In the exemplary embodiment of the present invention, the external charging devices may include a first charging device and a second charging device, and an output voltage of the first charging device may be less than an output voltage of the second charging device. In addition, the first charging device may be a commercially available quick charger, and an output voltage thereof may be about 200 to 500 V. The second charging device may be a high-voltage quick charger and an output voltage thereof may be equal to or greater than about 500 V. Further, a voltage of the battery for the front wheel may be about 200 to 500 V, and a voltage of the battery for the rear wheel may be equal to or greater than about 500 V.

Each of the external charging devices may be electrically connected to the first high-voltage battery 110 or the second high-voltage battery 130 and may be configured to charge the high-voltage batteries by supplying electric power through the bidirectional converter 350 to the remaining one of the first and second high-voltage batteries 110 and 130 that is electrically unconnected to the external charging device, which means that when a driver intends to charge the vehicle battery at a location where a commercially available quick charger is provided, the battery for the front wheel is directly charged with the commercially available quick charger by connecting the quick charger to the vehicle via a charge port of the battery for the front wheel, and at the same time the bidirectional converter may be operated to charge the battery for the rear wheel that is not directly connected to the charger.

Meanwhile, when the driver intends to charge the vehicle battery at a location where a high-voltage quick charger is provided, the battery for the rear wheel may be directly charged with the high-voltage quick charger by connecting the quick charger to the vehicle via a charge port of the battery for the rear wheel, and at the same time the bidirectional converter may be operated to charge the battery for the front wheel that is not directly connected to the charger.

The operation of the controller 450 will be described with reference to FIG. 6. The controller 450 may be configured to measure the voltage of the first high-voltage battery-side input terminal of the bidirectional converter 350 and the voltage of the second high-voltage battery-side output terminal the bidirectional converter 350. When the voltage of the input terminal of the bidirectional converter 350 is different from the voltage of the output terminal of the bidirectional converter 350, the controller 450 may be configured to operate the bidirectional converter 350.

When the first charging device (commercially available quick charger) 210 is connected to the first high-voltage battery 110 and a voltage of the first high-voltage battery 110 is less than that of the second high-voltage battery 130, the controller 450 may be configured to operate the bidirectional converter 350 as a boost converter. When the second charging device (high-voltage quick charger) 230 is connected to the second high-voltage battery 130 and a voltage of the first high-voltage battery 110 is less than that of the second high-voltage battery 130, the controller 450 may be configured to operate the bidirectional converter 350 as a buck converter.

Referring to FIG. 7, in the exemplary embodiment of the present invention, the bidirectional converter 350 may include a bidirectional converting circuit that has an inductor, a third switching device S1, and a fourth switching device S2. The switching device may include all semiconductor devices capable of high-frequency switching (several kHz) such as a MOSFLT/IGBT.

In particular, when the first charging device 210 is connected to the first high-voltage battery 110 and the voltage of the first high-voltage battery 110 is less than that of the second high-voltage battery 130 and when the bidirectional converter 350 is operated as the boost converter, the second high-voltage battery 130 may be charged by adjusting an ON period of the third switching device S1. When the second charging device 210 is connected to the second high-voltage battery 130, the voltage of the first high-voltage battery 110 is less than that of the second high-voltage battery 130, and when the bidirectional converter is operated as the buck converter, the first high-voltage battery 110 may be charged by adjusting an ON period of the fourth switching device S2. At this time, the third switching device S1 and the fourth switching device S2 may be operated complementarily to each other.

Referring to FIG. 8, in the exemplary embodiment of the present invention, the bidirectional converter 350 may include bidirectional converting circuits configured in parallel, and each of the bidirectional converting circuits may include an inductor, a third switching device S1 or S3, and a fourth switching device S2 or S4. By configuring the bidirectional converting circuits in parallel, inductor ripple current may be reduced.

Further, the controller 450 may be configured to generate a potential difference between the third switching devices S1 and S3 of the plurality of bidirectional converting circuits configured in parallel and generate a potential difference between the fourth switching devices S2 and S4 of the plurality of bidirectional converting circuits configured in parallel, thereby operating the bidirectional converter 350. In particular, a potential difference between the switching devices may be 360 degrees/parallel number as described above. For example, as shown in FIG. 4, the potential difference between the switching devices may be 180 degrees in the case of two parallel numbers, and may be 120 degrees in the case of three parallel numbers.

Referring to FIG. 9, a method of controlling charge of a vehicle battery according to an exemplary embodiment of the present invention may include: determining whether a first charging device is connected to a first high-voltage battery or whether a second charging device is connected to a second high-voltage battery (S500); determining whether charging of the first high-voltage battery and charging of the second high-voltage battery are required when the first charging device is connected to the first high-voltage battery or the second charging device is connected to the second high-voltage battery (S500); comparing a voltage of the first high-voltage battery and a voltage of the second high-voltage battery when charging of the first and second high-voltage batteries is required (S520); and operating a bidirectional converter when the voltage of the first high-voltage battery voltage is lower than the voltage of the second high-voltage battery voltage (S600, S700, S620, S640, S720, and S740). The above method may be executed by the controller.

In the operating of the bidirectional converter (S600, S700, S620, S640, S720, and S740), when the first charging device is connected to the first high-voltage battery and charging of the first and second high-voltage batteries is required, the voltage of the first high-voltage battery may be compared with the voltage of the second high-voltage battery. When the voltage of the first high-voltage battery is less than the voltage of the second high-voltage battery, a boost converter may be operated to charge the second high-voltage battery. On the other hand, when the second charging device is connected to the second high-voltage battery and charging of the first and second high-voltage batteries is required, the voltage of the first high-voltage battery may be compared with the voltage of the second high-voltage battery. When the voltage of the first high-voltage battery is less than the voltage of the second high-voltage battery, a buck converter may be operated to charge the first high-voltage battery.

As described above, in the system and the method of controlling charge of the vehicle battery according to various exemplary embodiments of the present invention, a vehicle equipped with a battery having a voltage greater than an output voltage of a commercially available quick charger may be charged with the quick charger. In other words, even when a voltage of a new vehicle battery is increased to be greater than that of an existing vehicle battery, it is compatible with the quick charger.

Further, even when the voltage of the battery for the front-wheel is different from the voltage of the battery for the rear-wheel, it is possible to simultaneously charge both batteries with one quick charger. The batteries may be compatible with both a commercially available quick charger (output voltage of 200 to 500 V) and a high-voltage quick charger (output voltage of equal to or greater than 500 V) by configuring two charge ports, and it may be possible to simultaneously charge the batteries for the front and rear wheels with any one of both quick chargers. By solving the compatibility problem with the quick chargers, a voltage of the battery may be further increased compared to the existing one, thereby allowing the inverter, the electric motor, and the connector to have increased efficiency, and to maximize a reduction in size, weight, and material cost thereof. In addition, since voltages of the batteries for the front and rear wheels may be configured differently, it may also possible to strategically develop the vehicle.

What is claimed is:

1. A system for controlling charge of a vehicle battery, the system comprising:
   a high-voltage battery mounted within a vehicle and configured to supply electric power to a drive unit of the vehicle;
   a boost converter mounted within the vehicle and electrically connected to the high-voltage battery;
   an external charging device disposed extraneous to the vehicle and electrically connected to the boost converter, the external charging device configured to charge the high-voltage battery by supplying electric power to the high-voltage battery using the boost converter; and
   a controller configured to measure a voltage of an external charging device-side input terminal of the boost converter and a voltage of a high-voltage battery-side output terminal of the boost converter, and operate the boost converter when the voltage of the external charging device-side input terminal of the boost converter is less than the voltage of the high-voltage battery-side output terminal of the boost converter,
   wherein the boost converter includes a plurality of boosting circuits configured in parallel and each boosting circuit of the plurality of boosting circuits includes an inductor, a switching device, and a diode.

2. The system of claim 1, wherein the controller is configured to operate the boost converter by generating a potential difference between the switching devices of the plurality of boosting circuits configured in parallel.

3. A system for controlling charge of a vehicle battery, comprising:
   high-voltage battery mounted within a vehicle and configured to supply electric power to a drive unit of the vehicle;
   a boost converter mounted within the vehicle and electrically connected to the high-voltage battery;
   an external charging device disposed extraneous to the vehicle and electrically connected to the boost converter, the external charging device configured to charge the high-voltage battery by supply electric power to the high-voltage battery using the boost converter; and
   a controller configured to measure a voltage of an external charging device-side input terminal of the boost converter and a voltage of a high-voltage battery-side output terminal of the boost converter, and operate the boost converter when the voltage of the input terminal of the boost converter is less than the voltage of the output terminal of the boost converter,
   wherein the boost converter includes a plurality of boosting circuits configured in parallel and each boosting circuit of the plurality of boosting circuits includes an inductor, a first switching device, and a second switching device.

4. The system of claim 3, wherein the controller is configured to measure the voltage of the external charging device-side input terminal of the boost converter, and when the voltage of the external charging device-side input terminal of the boost converter is lesser than a voltage of the high-voltage battery, the controller is configured to turn on the first switching device and the second switching device and generate a potential difference between the first switching devices of the plurality of boosting circuits configured in parallel, and generate a potential difference between the second switching devices of the plurality of boosting circuits configured in parallel to operate the boost converter.

5. The system of claim 3, wherein the controller is configured to measure the voltage of the external charging device-side input terminal of the boost converter and when the voltage of the external charging device-side input terminal of the boost converter is greater than or equal to a voltage of the high-voltage battery, the controller is configured to turn off the first switching devices and turn on the second switching devices.

6. A method of controlling charge of a vehicle battery, the method comprising:
   determining, by a controller, whether charging of the vehicle battery is required;
   comparing, by the controller, a voltage of the vehicle battery and an output voltage of a charging device when charging of the vehicle battery is required; and
   operating, by the controller, a boost converter when the voltage of the vehicle battery is greater than the output voltage of the charging device,
   wherein the boost converter includes a plurality of boosting circuits configured in parallel and each boosting circuit of the plurality of boosting circuits includes an inductor, a switching device, and a diode.

7. A system for controlling charge of a vehicle battery, the system comprising:
   a first high-voltage battery configured to supply electric power to a front wheel drive unit of a vehicle;
   a second high-voltage battery configured to supply electric power to a rear wheel drive unit of the vehicle;
   a bidirectional converter mounted within the vehicle and electrically connected at a first side thereof to the first high-voltage battery and at a second side thereof to the second high-voltage battery; and
   external charging devices disposed extraneous to the vehicle, each external charging device of the external charging devices being electrically connected to the first high-voltage battery or the second high-voltage battery, and configured to charge either the first high-voltage battery or the second high-voltage battery by supplying electric power using the bidirectional converter to a remaining one of the first high-voltage battery and the second high-voltage battery that is electrically unconnected to said each external charging device; and
   a controller configured to measure a voltage of a first high-voltage battery-side input terminal of the bidirectional converter and a voltage of a second high-voltage battery-side output terminal of the bidirectional converter, and operate the bidirectional converter when the voltage of the first high-voltage battery side input terminal of the bidirectional converter is different from the voltage of the second high-voltage battery side output terminal of the bidirectional converter.

8. The system of claim 7, wherein the external charging devices include a first charging device and a second charging device, and an output voltage of the first charging device is less than an output voltage of the second charging device.

9. The system of claim 8, wherein when the first charging device is connected to the first high-voltage battery, and a voltage of the first high-voltage battery is lesser than a voltage of the second high-voltage battery, the controller operates a boost converter.

10. The system of claim 8, wherein when the second charging device is connected to the second high-voltage battery, and a voltage of the first high-voltage battery is lesser than a voltage of the second high-voltage battery the controller is configured to operate a buck converter.

11. The system of claim 7, wherein the bidirectional converter includes an inductor, a third switching device, and a fourth switching device.

12. The system of claim 7, wherein the bidirectional converter includes a plurality of converting circuits configured in parallel, and each converting circuit of the converting circuits includes an inductor, a third switching device, and a fourth switching device.

13. The system of claim 12, wherein the controller is configured to generate a potential difference between the third switching devices of the plurality of converting circuits configured in parallel, and generate a potential difference between the fourth switching devices of the plurality of converting circuits configured in parallel to operate the bidirectional converter.

14. A method of controlling charge of a vehicle battery, the method comprising:
   determining, by a controller, whether a first charging device is connected to a first high-voltage battery or whether a second charging device is connected to a second high-voltage battery;
   determining, by the controller, whether charging of the first high-voltage battery and charging of the second high-voltage battery are required when the first charging device is connected to the first high-voltage battery or the second charging device is connected to the second high-voltage battery;
   comparing, by the controller, a voltage of the first high-voltage battery and a voltage of the second high-voltage battery when charging of the first high-voltage battery and the second high-voltage battery is required; and
   operating, by the controller, a bidirectional converter when the voltage of the first high-voltage battery is lesser than the voltage of the second high-voltage battery.

15. The method of claim 14, wherein in the operating a bidirectional converter, when the first charging device is connected to the first high-voltage battery, a boost converter is operated.

16. The method of claim 14, wherein in the operating a bidirectional converter, when the second charging device is connected to the second high-voltage battery, a buck converter is operated.

17. A method of controlling charge of a vehicle battery, comprising:
   determining, by a controller, whether charging of the vehicle battery is required;
   comparing, by the controller, a voltage of the battery and an output voltage of a charging device when charging of the battery is required; and
   operating, by the controller, a boost converter when the voltage of the battery is greater than the output voltage of the charging device,
   wherein the boost converter includes a plurality of boosting circuits configured in parallel and each boosting circuit of the plurality of boosting circuits includes an inductor, a first switching device, and a second switching device.

* * * * *